US011423939B1

(12) United States Patent
Jubert et al.

(10) Patent No.: US 11,423,939 B1
(45) Date of Patent: Aug. 23, 2022

(54) DATA STORAGE DEVICE DETECTING WRITE POLE DEGRADATION FOR MAGNETIC WRITE HEAD

(71) Applicant: Western Digital Technologies, Inc., San Jose, CA (US)

(72) Inventors: Pierre-Olivier Jubert, San Jose, CA (US); Sukumar Rajauria, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/176,302

(22) Filed: Feb. 16, 2021

(51) Int. Cl.
   *G11B 21/02* (2006.01)
   *G11B 5/127* (2006.01)

(52) U.S. Cl.
   CPC ............. *G11B 21/02* (2013.01); *G11B 5/127* (2013.01)

(58) Field of Classification Search
   None
   See application file for complete search history.

(56) References Cited

U.S. PATENT DOCUMENTS

| 6,166,536 | A | 12/2000 | Chen et al. |
| 6,304,081 | B1 | 10/2001 | Richter |
| 8,908,483 | B1 | 12/2014 | Ren et al. |
| 8,929,186 | B1 * | 1/2015 | Sharma ................ G11B 5/012 369/47.53 |
| 9,183,859 | B1 * | 11/2015 | Alex .................... G11B 5/455 |
| 9,396,750 | B2 | 7/2016 | Chu et al. |
| 9,837,118 | B1 | 12/2017 | Mader et al. |
| 10,043,540 | B1 | 8/2018 | Yang |
| 10,147,454 | B1 | 12/2018 | Mendonsa et al. |
| 10,339,963 | B1 | 7/2019 | Mader et al. |
| 10,672,419 | B1 * | 6/2020 | Matsumoto ........... G11B 5/012 |
| 10,699,736 | B1 | 6/2020 | Rajauria et al. |
| 10,878,844 | B1 * | 12/2020 | Tsai .................... G11B 20/18 |
| 11,257,525 | B1 * | 2/2022 | Rajauria ............... G11B 27/36 |
| 2019/0371362 | A1 * | 12/2019 | Nichols ............... G11B 5/5534 |

OTHER PUBLICATIONS

Hai Li, "Storage Physics and Noise Mechanism in Heat-Assisted Magnetic Recording," Carnegie Mellon University. Thesis. Sep. 2016. https://doi.org/10.1184/R1/6723209.v1.

(Continued)

*Primary Examiner* — William J Klimowicz
(74) *Attorney, Agent, or Firm* — Patterson + Sheridan, LLP; Steven H. VerSteeg

(57) ABSTRACT

A data storage device is disclosed comprising a head actuated over a magnetic media, wherein the head comprises a write coil and a write pole. A test pattern is written to the magnetic media by applying a first current to the write coil. A second current is applied to the write coil while the head passes over the test pattern, wherein the second current has a polarity opposite the first current. After applying the second current to the write coil while the head passes over the test pattern, the test pattern is read from the magnetic media using the head to generate a first read signal, and a first noise power of the first read signal is measured. A degradation of the write pole is detected based on the first noise power measurement.

23 Claims, 5 Drawing Sheets

(56) References Cited

OTHER PUBLICATIONS

M. J. Vos, Y. Tanaka and J. H. Judy, "Measurements and modelling of noise in DC-erased thin-film media," in IEEE Transactions on Magnetics, vol. 26, No. 5, pp. 2149-2151, Sep. 1990.

G. J. Tarnopolsky, L. T. Tran, A. M. Barany, H. N. Bertram and D. R. Bloomquist, "DC modulation noise and demagnetizing fields in thin metallic media," in IEEE Transactions on Magnetics, vol. 25, No. 4, pp. 3160-3165, Jul. 1989.

T. D. Trinh, S. Rajauria, R. Smith, E. Schreck, Q. Dai and F. E. Talke, "Temperature-Induced Near-Field Transducer Failure in Heat-Assisted Magnetic Recording," in IEEE Transactions on Magnetics, vol. 56, No. 6, pp. 1-4, Jun. 2020.

I. Gilbert, D. A. Saunders, P. Czoschke, Z. Liu, S. Granz and T. Rausch, "Measuring Cross-Track Thermal Gradient in Heat-Assisted Magnetic Recording," in IEEE Transactions on Magnetics, vol. 55, No. 12, pp. 1-5, Dec. 2019.

Shaomin Xiong, Robert Smith, Jian Xu, Shuji Nishida, Masaru Furukawa, Kenji Tasaka, Kenji Kuroki, Yeoungchin Yoon, Na Wang, Sripathi Canchi, Erhard Schreck, and Qing Dai, "Setting Write Spacing in Heat Assisted Magnetic Recording," in IEEE Transactions on Magnetics, vol. 54, No. 8, pp. 1-7, Aug. 2018.

I. Gilbert, Z. Liu, X. Zheng, S. Granz, W. Eppler and T. Rausch, "Measuring Thermal Gradient in HAMR Using Pseudorandom Bit Sequences," in IEEE Transactions on Magnetics, vol. 55, No. 3, pp. 1-6, Mar. 2019.

H. J. Richter, C. C. Poon, G. Parker, M. Staffaroni, O. Mosendz, R. Zakai, and B. C. Stipe, "Direct Measurement of the Thermal Gradient in Heat Assisted Magnetic Recording," in IEEE Transactions on Magnetics, vol. 49, No. 10, pp. 5378-5381, Oct. 2013.

* cited by examiner

DATA STORAGE DEVICE DETECTING WRITE POLE DEGRADATION FOR MAGNETIC WRITE HEAD

CROSS REFERENCE TO RELATED APPLICATIONS

This application is related to U.S. patent application Ser. No. 17/176,354 entitled "DATA STORAGE DEVICE MEASURING HAMR MEDIA DISTRIBUTIONS" (now issued as U.S. Pat. No. 11,276,432) and U.S. patent application Ser. No. 17/176,282 entitled "DATA STORAGE DEVICE PREDICTING FAILURE OF NEAR FIELD TRANSDUCER BASED ON SLOPE OF THERMAL GRADIENT" (now issued as U.S. Pat. No. 11,257,525), which are hereby incorporated by reference in their entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Data is typically written to the disk by modulating a write current in an inductive coil (write coil) to record magnetic transitions onto the disk surface in a process referred to as saturation recording. During read-back, the magnetic transitions are sensed by a read element (e.g., a magneto-resistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head. Microwave assisted magnetic recording (MAMR) is also a recent development that improves the quality of written data by using a spin torque oscillator (STO) to apply a high frequency auxiliary magnetic field to the media close to the resonant frequency of the magnetic grains, thereby enabling the magnetic field generated by the write coil to more readily magnetize the disk surface.

DETAILED DESCRIPTION

Figure 1A:
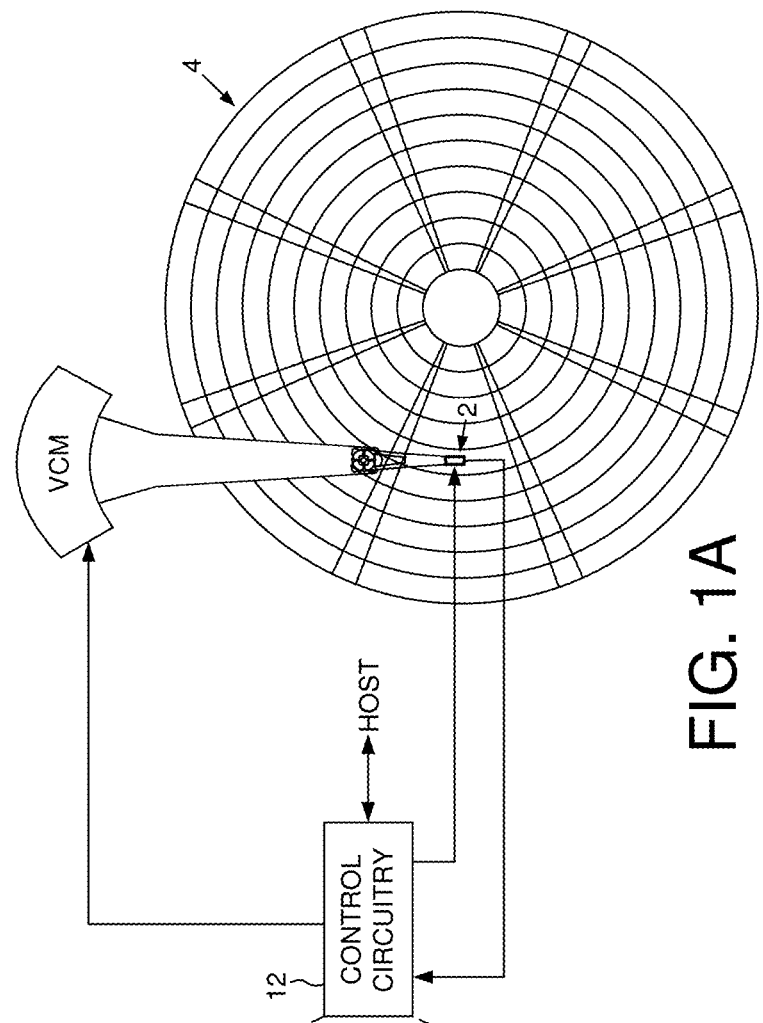
FIG. 1A shows a data storage device in the form of a disk drive according to an embodiment comprising a head actuated over a disk.
Figure 1B:
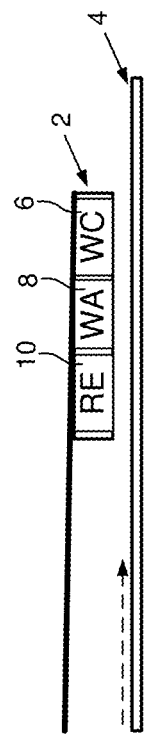
FIG. 1B shows an embodiment wherein the head comprises a write coil configured to excite a write pole to generate a magnetic write field, a write assist element, and a read element.
Figure 1C:
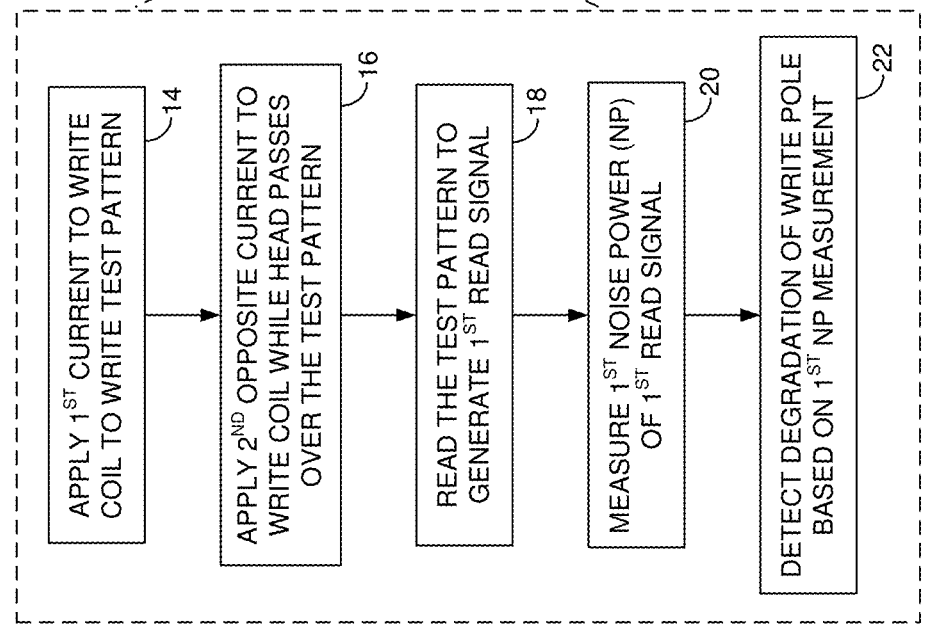
FIG. 1C is a flow diagram according to an embodiment wherein degradation of the write pole is detected based on a noise power measurement of the read signal.

FIG. 1A shows a data storage device in the form of a disk drive according to an embodiment comprising a head 2 actuated over a magnetic media such as a disk 4, wherein in one embodiment shown in FIG. 1B, the head 2 comprises a write coil 6 configured to excite a write pole to generate a magnetic write field, a write assist element 8, and a read element 10. While a disk drive is used as an illustrative example herein, various embodiments of the invention may be applied to, and/or include, other types of data storage device with magnetic media such as tape drives. The disk drive further comprises control circuitry 12 configured to execute the flow diagram of FIG. 1C, wherein a test pattern is written to the magnetic media by applying a first current to the write coil (block 14). A second current is applied to the write coil while the head passes over the test pattern, wherein the second current has a polarity opposite the first current (block 16). After applying the second current to the write coil while the head passes over the test pattern, the test pattern is read from the magnetic media using the head to generate a first read signal (block 18). A first noise power of the first read signal is measured (block 20), and degradation of the write pole is detected based on the first noise power measurement (block 22).

Figure 2:
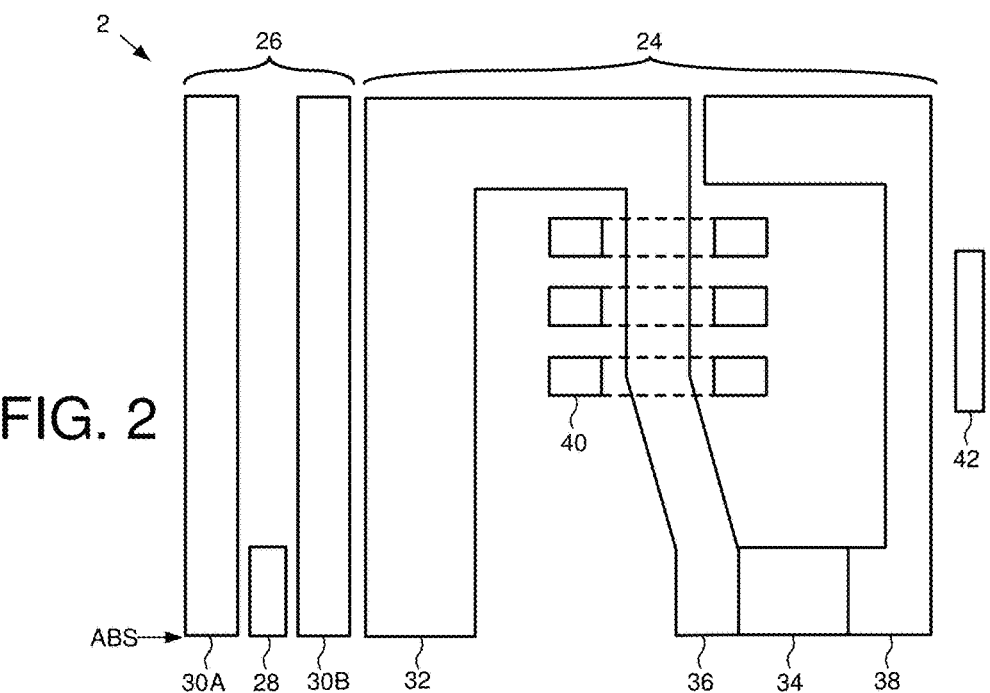
FIG. 2 shows a cross-section of a head according to an embodiment comprising a write assist element (e.g., a laser for HAMR or a STO for MAMR) and a write coil for exciting a write pole.

FIG. 2 shows a cross-sectional view of a suitable head 2 according to an embodiment, wherein the head 2 may comprise more or fewer elements in various other embodiments. In the embodiment of FIG. 2, the head 2 comprises write elements 24 configured to write data to the disk surface, and read elements 26 configured to read data from the disk surface. The bottom surface of the head 2 facing the disk surface is referred to as an air bearing surface (ABS) wherein an air bearing forms between the head 2 and the disk surface due to the disk spinning such that the head 2 effectively flies above the disk surface. The read elements 26 of the head 2 may comprise a magnetoresistive (MR) read element 28 that is fabricated between MR shields 30A and 30B. Other embodiments may employ a different read element, such as a suitable magnetic tunneling junction (MTJ) read element. The write elements 24 comprise a return pole 32, a write assist element 34 (e.g., a suitable laser and NFT in HAMR, a STO in MAMR, or a material stack, including conductive materials, used in energy assisted recording) fabricated between a main pole 36 and a trailing shield 38, and a write coil 40 that excites the main pole 36 to generate a magnetic write field that magnetizes the disk surface, thereby writing data to the disk surface. The head 2 may also comprise a fly height actuator (FHA) 42 that is biased to achieve a target fly height of the head 2 over the disk surface. Any suitable FHA 42 may be employed, such as a suitable thermal actuator that adjusts the fly height through thermal expansion, or a suitable mechanical actuator such as a suitable piezoelectric actuator that adjusts the fly height through mechanical deflection. It is noted that examples of a material stack as the write assist element 34 include those described in U.S. Pat. No. 10,366,714, titled "Magnetic write head for providing spin-torque-assisted write field enhancement," to Olson et al., and in U.S. Pat. No. 10,679,650, titled "Current-assisted magnetic recording write head with improved write gap structure" to Bai et al., both of which are hereby incorporated by reference.

In one embodiment, one or both of the main pole 36 and/or the return pole 32 of the head 2 may degrade over time causing a corresponding degradation of the written data. Therefore it is desirable to detect degradation of one or both of the write poles in order to take any suitable corrective action, such as warning the user of an impending failure, convert the corresponding disk surface to "read only," collect degradation data to improve manufacturing processes, etc. The inventors have discovered there is a relatively high correlation between changes in the noise power of the read signal over time and degradation of one or both of the write poles. Accordingly in one embodiment a noise power of the read signal is periodically measured and degradation of one or both write poles detected based on changes in the noise power measurement.

Any suitable technique may be employed to measure the noise power of the read signal in order to detect degradation of a write pole. In one embodiment shown in FIG. 3A, a test pattern may be written to the magnetic media using a high temperature (e.g., high bias applied to the write assist element 34, such as a laser) in order to heat the magnetic media significantly above its mean Curie temperature and a high magnetic field 44 (high current applied to the write coil) in order to initialize the grains of the magnetic media into a predetermined orientation (e.g., all down in the example of FIG. 3A). The test pattern is then subjected to a lower temperature (via a lower bias applied to the write assist element 34, such as the laser) and a lower magnetic field 46 having a magnetic orientation opposite of the grains as shown in FIG. 3B (i.e., an overwrite operation). The read element 10 is then used to read the test pattern, and a noise power of the resulting read signal is measured. For simplicity of description, the write assist element 34 in the various embodiments below will be referred to as a laser, but the embodiments are not limited to just HAMR as discussed above, as other example write assist elements can similarly be used to generate heat in the media.

Figure 3A:
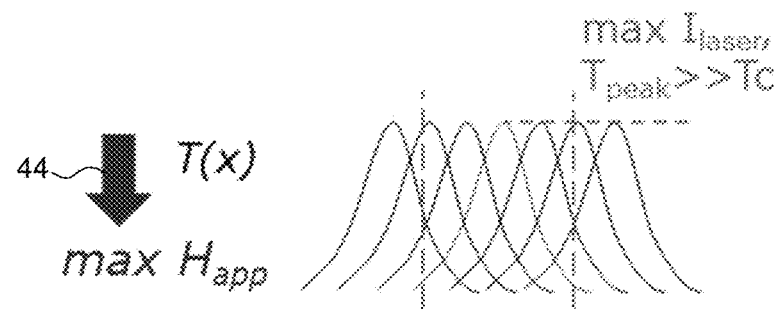
FIG. 3A shows an embodiment wherein a test pattern is written to the magnetic media using a high bias applied to the laser and a high current applied to the write coil.
Figure 3B:
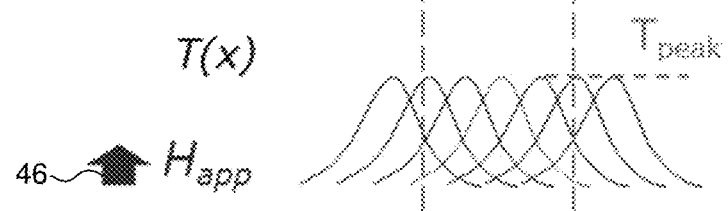
FIG. 3B shows an embodiment wherein the test pattern is read after applying a second bias to the laser while the head passes over the test pattern, wherein a noise power of the resulting read signal is measured.

In the embodiment shown in FIG. 3A, the test pattern is "band written" by rewriting the test pattern at a number of radial offsets in order to subject a predetermined band of the magnetic media to the peak media temperature induced by the laser. Similarly in the embodiment of FIG. 3B, the overwrite operation is executed at a number of radial offsets in order to subject the predetermined band of the magnetic media to the peak media temperature induced by the laser. Any suitable test pattern may be written to the magnetic media, such as a DC pattern or an AC pattern, as long as the initial saturated state of the magnetic media is known prior to the overwrite operation.

In one embodiment, the noise power measurement of the read signal may be made by writing the test pattern as show in FIG. 3A so that the grains have a first magnetic orientation (e.g., all down) prior to the overwrite operation. The noise power measurement of the read signal may also be made by writing the test pattern so that the grains have a second orientation (e.g., all up) prior to the overwrite operation. The two noise power measurements may then be averaged in order to improve the accuracy of the final measurement.

In one embodiment, when the magnetic field 46 during the overwrite operation of FIG. 3B is approximately zero (i.e., when the current applied to the write coil is approximately zero), the resulting noise power measurement of the read signal is affected primarily by the Curie temperature properties of the magnetic media. Accordingly in one embodiment shown in FIG. 4, the bias applied to the laser (laser current in this example) is swept through a range of settings from low to high over a number of corresponding overwrite operations. For each setting of the laser current the overwrite operation of FIG. 3B is executed, and after the overwrite operation the test pattern is read and the noise power of the read signal measured as represented by curve 48 in FIG. 4. In one embodiment, at least one parameter of a noise power function may then be generated by curve fitting the noise power measurements of curve 48 to the noise power function.

Figure 4:
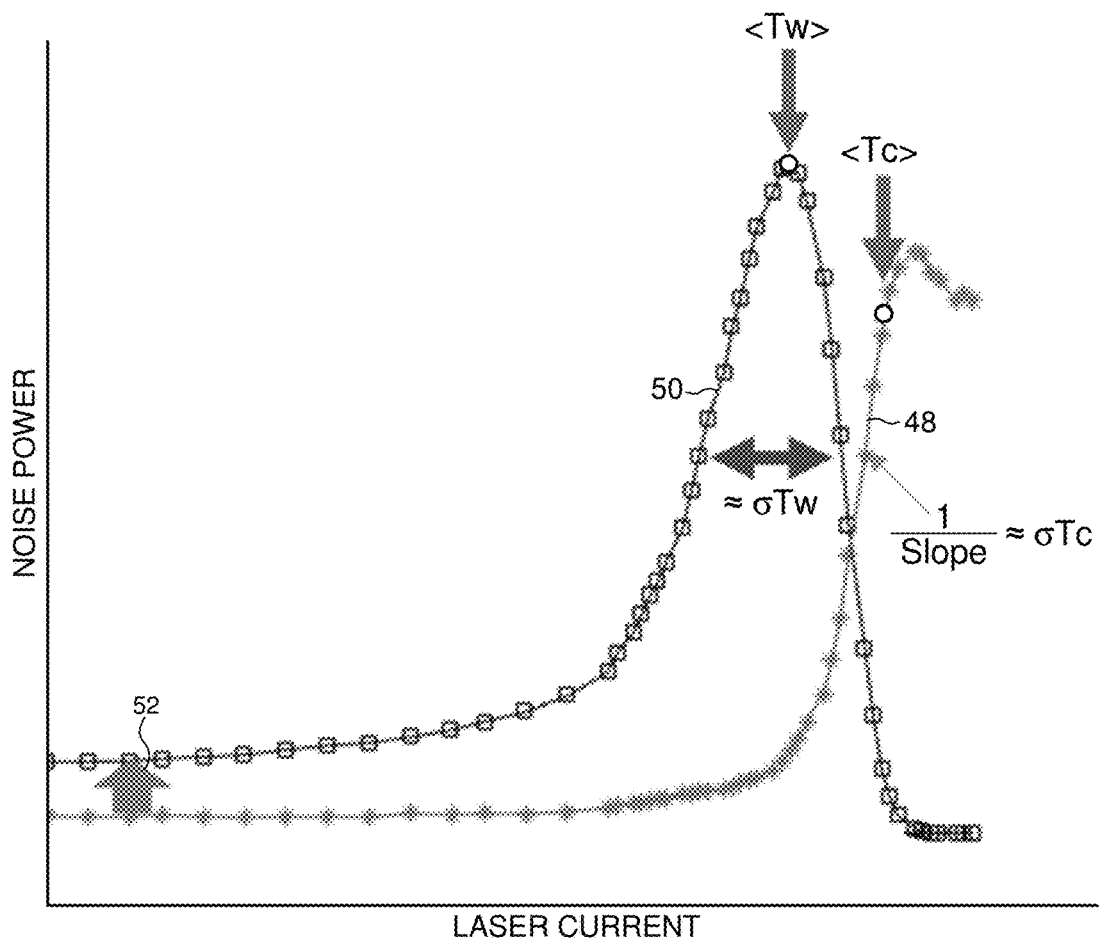
FIG. 4 shows a plot of noise power of the read signal versus a bias current applied to a laser when the current applied to the write coil is approximately zero, and when the current applied to the write coil is a calibrated current that achieves a target capacity of the magnetic media.

In one embodiment, the grains of the magnetic media may be re-initialized such as shown in FIG. 3A prior to each overwrite operation (for each different laser current setting shown in FIG. 4). In another embodiment, the process of generating the noise power measurements shown in FIG. 4 may be expedited by performing each overwrite operation without re-initializing the grains of the magnetic media (i.e., in one embodiment the grains may be initialized one time such as shown in FIG. 3A prior to executing a number of the overwrite operations each at an incrementally higher laser current).

FIG. 4 shows an embodiment wherein a noise power curve 50 may be generated for a given non-zero magnetic field 46 (i.e., write current) applied to the magnetic media during the overwrite operation (e.g., as shown in FIG. 3B). That is, in one embodiment the laser current is adjusted incrementally for each overwrite operation while also applying a given non-zero magnetic field 46. Based on the resulting noise power curve 50 the average write temperature <Tw> may be estimated as well as the standard deviation σTw of the write temperature (which may be approximated as the peak and the width of the distribution as shown in FIG. 4). In one embodiment the noise power may be measured periodically at room temperature (low laser current) for zero write current (curve 48 in FIG. 4) and for a calibrated operating write current (curve 50 in FIG. 4), wherein when the difference 52 decreases below a threshold over time (or a slope of the difference exceeds a threshold), it may indicate a write pole of the head is degrading.

Figure 5A:
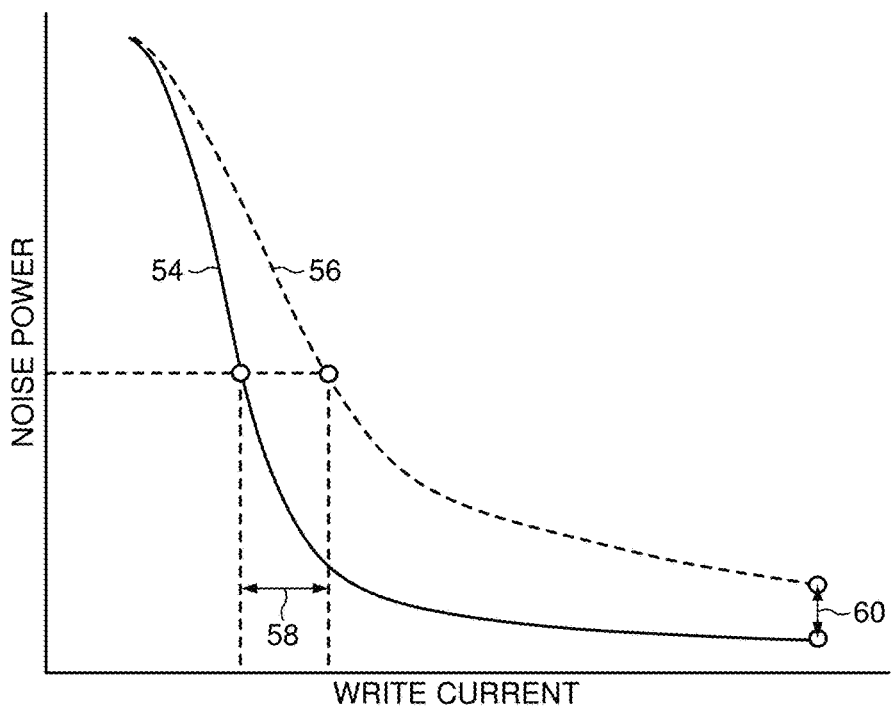
FIG. 5A shows a plot of the noise power of the read signal versus a write current applied to the write coil, wherein in one embodiment degradation of the write pole is detected by detecting a change in the noise power curve over time.
Figure 5B:
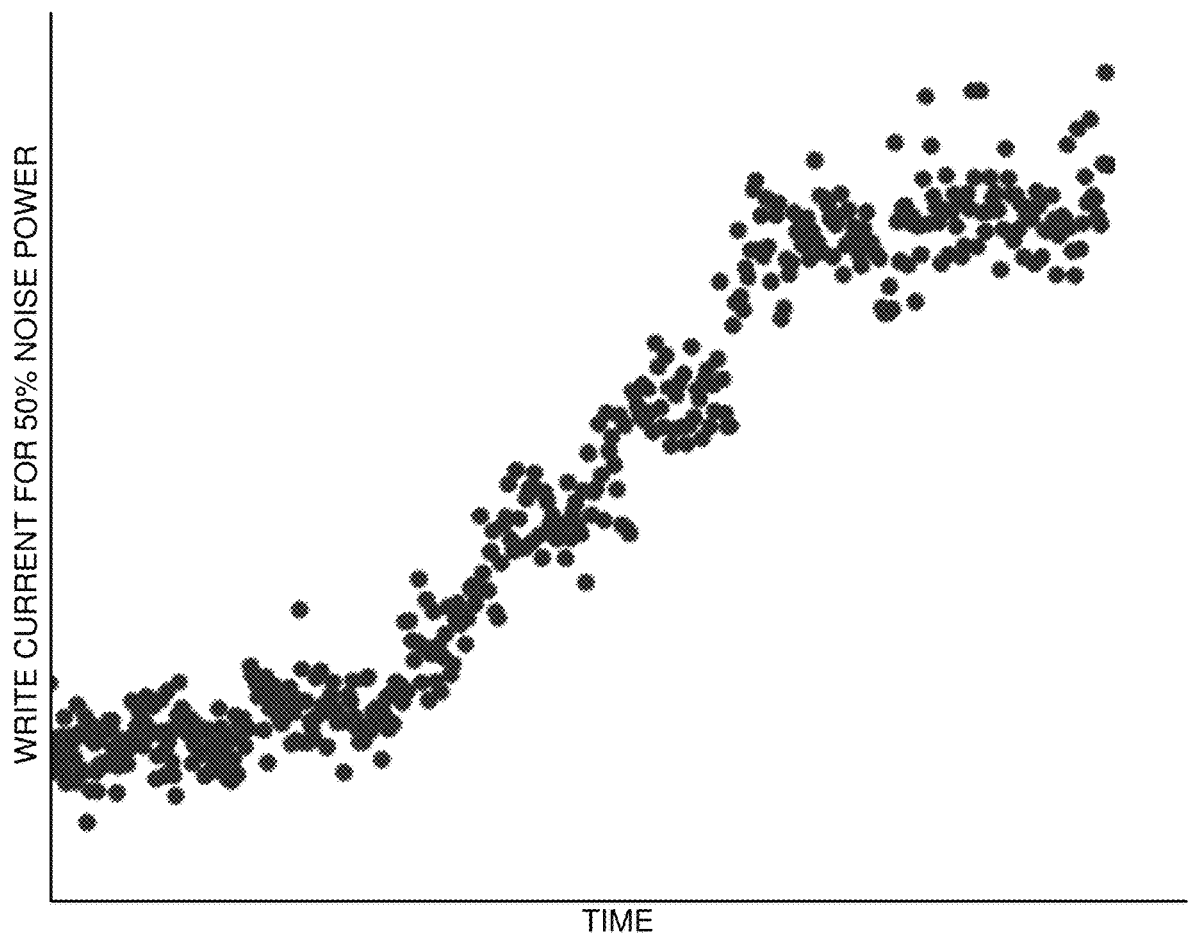
FIG. 5B shows a change over time of the write current required for the noise power to reach fifty percent of its maximum which can indicate degradation of a write pole.

In one embodiment, a noise power curve may be generated relative to the write current applied to the write coil as shown in FIG. 5A, wherein a change in the noise power curve over time may indicate a write pole of the head is degrading. In one embodiment, the noise power curve shown in FIG. 5A is generated at a high media temperature (high laser current) that is above the mean Curie temperature of the grains. For example in FIG. 5A a noise power curve 54 may be generated early in the life of the data storage device (e.g., during manufacturing). Periodically over the life of the data storage device the noise power curve may be regenerated (e.g., noise power curve 56 in FIG. 5A) and compared to the initial noise power curve 54 in order to detect a degradation of a write pole. Any suitable feature of the noise power curve may be evaluated in order to detect degradation of a write pole. In one embodiment, a difference 58 in the write current required for the noise power to reach fifty percent of its maximum may be evaluated, such as detecting when the difference 58 exceeds a threshold, or when a rate of change (slope) of the difference 58 exceeds a threshold. FIG. 5B shows an example of the write current for fifty percent noise power changing over time, wherein the amplitude, change in amplitude, rate of change, etc., may indicate degradation of a write pole. In another embodiment, a difference 60 in the noise power measurement at a target write current required to at least partially saturate the magnetic media may be evaluated, such as detecting when the difference 60 exceeds a threshold, or when a rate of change (slope) of the difference 60 exceeds a threshold.

When generating the noise power curve such as shown in FIG. 5A using a high media temperature (high laser current) above the mean Curie temperature of the grains in HAMR, in one embodiment it may not be necessary to initialize the grains of the magnetic media into a predetermined orientation (e.g., all down in the example of FIG. 3A). That is in an alternative embodiment, when applying the low write current (first setting of FIG. 5A) to a test pattern (test area) of the magnetic media and a high laser current, the resulting high media temperature will orient the gains randomly such that the noise power of the read signal is maximum. Incrementally increasing the write current as shown in FIG. 5A will then cause the grains to gradually orient into the direction of the magnetic write field causing the noise power to decrease as the write current increases.

Figure 6A:
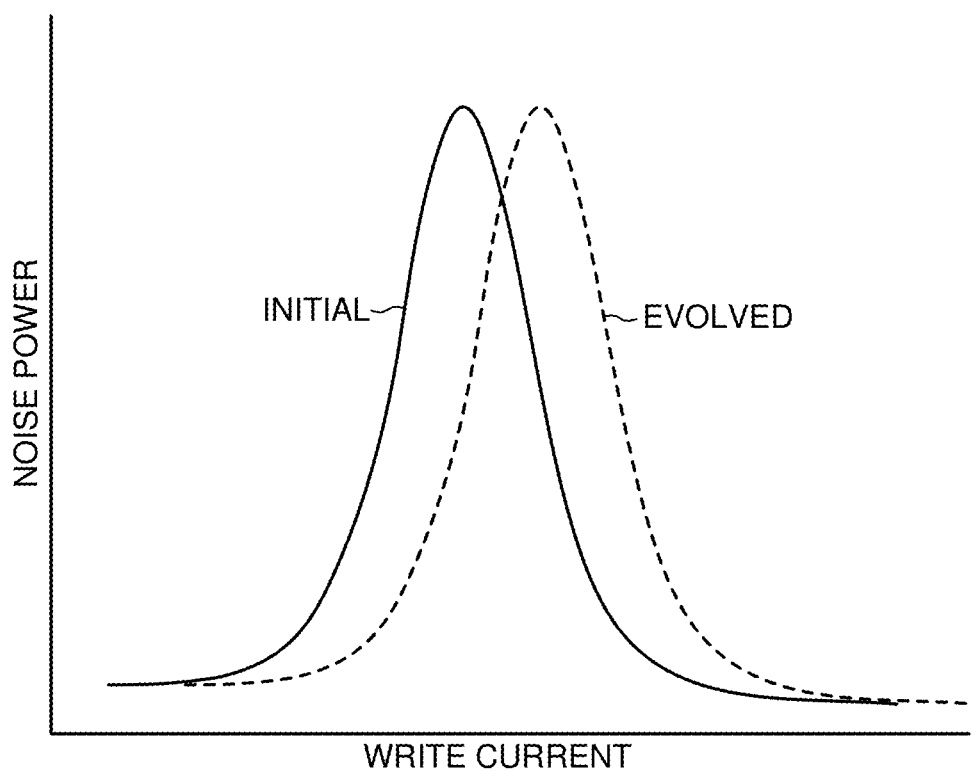
FIG. 6A shows an example embodiment of the noise power curve evolving over time when the test pattern is initially written with a DC or low frequency AC pattern and then an overwrite operation applies an opposite magnetic write field to the test pattern.
Figure 6B:
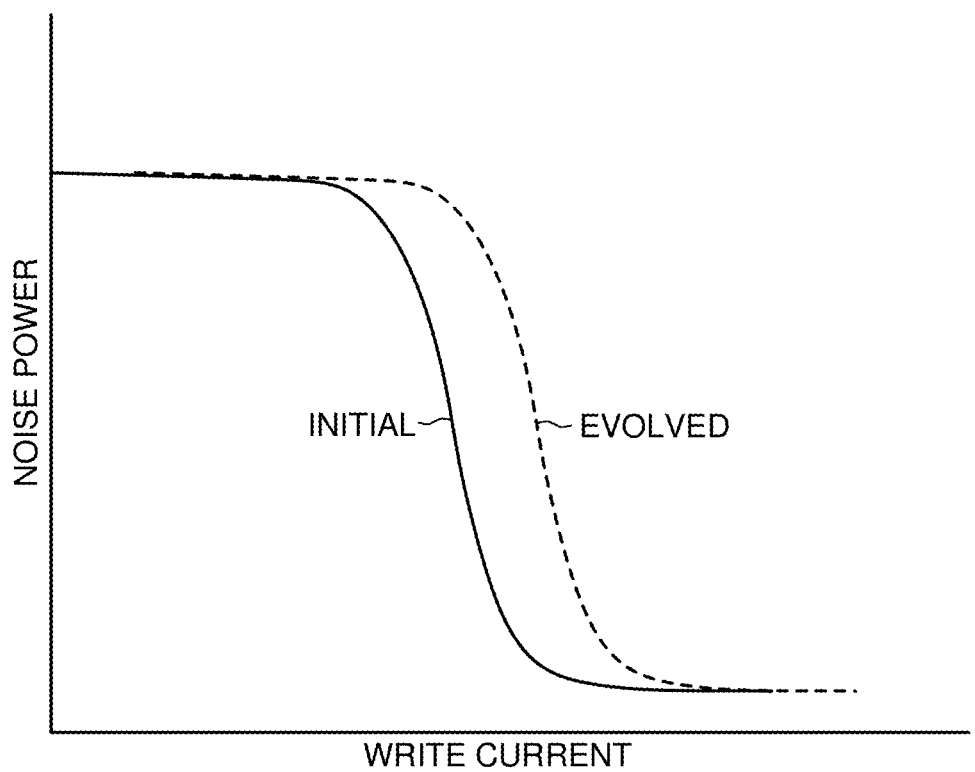
FIG. 6B shows an example embodiment of the noise power curve evolving over time when the test pattern is initially written with a high frequency AC pattern and then an overwrite operation applies a DC magnetic write field.

In an embodiment employing conventional magnetic recording (e.g., longitudinal or perpendicular magnet recording) where a write assist is unavailable or unable to initialize the test pattern as described above, the test pattern may be initialized by writing a DC or AC test pattern using a suitable write current. FIG. 6A shows an example embodiment of the noise power curve evolving over time when the test pattern is initially written with a DC or low frequency AC pattern and then the overwrite operation applies an opposite magnetic write field to the test pattern. FIG. 6B shows an example embodiment of the noise power curve evolving over time when the test pattern is initially written with a high frequency AC pattern and then the overwrite operation applies a DC magnetic write field.

Any suitable conventional technique may be employed to measure the noise power of the read signal in the above described embodiments. For example, techniques for measuring the noise power of a read signal are disclosed in the technical articles "MEASUREMENTS AND MODELING OF NOISE IN DC-ERASED THIN-FILM MEDIA" by Martin J. Vos, et al., and "DC MODULATION NOISE AND DEMAGNETIZING FIELDS IN THINK METALLIC MEDIA" by Giora J. Tarnopolsky et al., the disclosures of which are incorporated herein by reference.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a magnetic media;
a head actuatable over the magnetic media, wherein the head comprises a write coil and a write pole; and
control circuitry configured to:
  write a test pattern to the magnetic media by applying a first current to the write coil;
  apply a second current to the write coil while the head passes over the test pattern, wherein the second current has a polarity opposite the first current;
  after applying the second current to the write coil while the head passes over the test pattern, read the test pattern from the magnetic media using the head to generate a first read signal;
  measure a first noise power of the first read signal; and
  detect degradation of the write pole based on the first noise power.

2. The data storage device as recited in claim 1, wherein the control circuitry is further configured to:
  apply a third current to the write coil while the head passes over the test pattern wherein the third current has a polarity the same as the second current;
  after applying the third current to the write coil while the head passes over the test pattern, read the test pattern from the magnetic media using the head to generate a second read signal;
  measure a second noise power of the second read signal; and
  detect degradation of the write pole based on the first and second noise powers.

3. The data storage device as recited in claim 2, wherein the control circuitry is further configured to:
  estimate a target current applied to the write coil that achieves a target noise power measurement based on the first and second noise powers; and
  detect the degradation of the write pole based on the target current.

4. The data storage device as recited in claim 3, wherein the control circuitry is further configured to detect degradation of the write pole when a change in the target current exceeds a threshold.

5. The data storage device as recited in claim 3, wherein the control circuitry is further configured to detect degradation of the write pole when a rate of change of the target current exceeds a threshold.

6. The data storage device as recited in claim 2, wherein the control circuitry is further configured to:
  estimate a target current applied to the write coil that achieves at least partial saturation of the magnetic media; and
  detect the degradation of the write pole based on a noise power measurement at the target current.

7. The data storage device as recited in claim 1, wherein the head further comprises a write assist element and the control circuitry is further configured to apply a first bias to the write assist element while writing the test pattern to the magnetic media.

8. The data storage device as recited in claim 7, wherein the control circuitry is further configured to apply a second bias to the write assist element while the head passes over the test pattern.

9. The data storage device as recited in claim 8, wherein the control circuitry is further configured to calibrate the second bias to achieve a target capacity of the magnetic media.

10. A data storage device comprising:
a magnetic media;
a head actuatable over the magnetic media, wherein the head comprises a write coil and a write pole; and
control circuitry configured to:
  apply a current to the write coil while the head passes over a test area of the magnetic media;
  after applying the current to the write coil while the head passes over the test area, read the test area using the head to generate a first read signal;
  measure a first noise power of the first read signal;
  estimate a target current applied to the write coil that achieves a target noise power measurement based on the first noise power; and
  detect degradation of the write pole based on the first noise power and the target current.

11. The data storage device as recited in claim 10, wherein prior to reading the test area, the control circuitry is further configured to:
  write a test pattern to the test area of the magnetic media by applying a first current to the write coil; and
  apply a second current to the write coil while the head passes over the test area, wherein the second current has a polarity opposite the first current.

12. The data storage device as recited in claim 11, wherein:
  the target current achieves at least partial saturation of the magnetic media; and
  the control circuitry is further configured to detect the degradation of the write pole based on the target noise power measurement at the target current.

13. The data storage device as recited in claim 10, wherein the control circuitry is further configured to detect degradation of the write pole when a change in the target current exceeds a threshold.

14. The data storage device as recited in claim 10, wherein the control circuitry is further configured to detect degradation of the write pole when a rate of change of the target current exceeds a threshold.

15. The data storage device as recited in claim 10, wherein the head further comprises a write assist element and the control circuitry is further configured to apply a first bias to the write assist element while applying the current to the write coil while the head passes over the test area of the magnetic media.

16. The data storage device as recited in claim 15, wherein the control circuitry is further configured to apply a second bias to the write assist element while the head passes over the test area.

17. The data storage device as recited in claim 16, wherein the control circuitry is further configured to calibrate the second bias to achieve a target capacity of the magnetic media.

18. A data storage device comprising:
a magnetic media;
a head actuatable over the magnetic media, wherein the head comprises a write coil and a write pole;
a means for writing a test pattern to a test area of the magnetic media by applying a first current to the write coil;
a means for applying a second current to the write coil while the head passes over the test area, wherein the second current has a polarity opposite the first current;

a means for reading the test area from the magnetic media using the head, after writing the test pattern to the test area and after applying the second current to the write coil while the head passes over the test area, to generate a first read signal;

a means for measuring a first noise power of the first read signal; and a means for detecting degradation of the write pole based on the first noise power.

19. A data storage device comprising:

a magnetic media;

a head actuatable over the magnetic media, wherein the head comprises a write coil and a write pole; and control circuitry configured to:

write a test pattern to a test area of the magnetic media by applying a first current to the write coil;

apply a second current to the write coil while the head passes over the test area, wherein the second current has a polarity opposite the first current;

after writing the test pattern to the test area and after applying the second current to the write coil while the head passes over the test area, read the test area using the head to generate a first read signal;

measure a first noise power of the first read signal; and detect degradation of the write pole based on the first noise power.

20. The data storage device as recited in claim 19, wherein the control circuitry is further configured to:

estimate a target current that achieves at least partial saturation of the magnetic media; and detect the degradation of the write pole based on a noise power measurement at the target current.

21. A data storage device comprising:

a magnetic media;

a head actuatable over the magnetic media, wherein the head comprises a write coil, a write pole, and a write assist element; and control circuitry configured to:

apply a current to the write coil while the head passes over a test area of the magnetic media;

apply a first bias to the write assist element while applying the current to the write coil while the head passes over the test area of the magnetic media;

after applying the current to the write coil while the head passes over the test area, read the test area using the head to generate a first read signal;

measure a first noise power of the first read signal; and detect degradation of the write pole based on the first noise power.

22. The data storage device as recited in claim 21, wherein the control circuitry is further configured to apply a second bias to the write assist element while the head passes over the test area.

23. The data storage device as recited in claim 22, wherein the control circuitry is further configured to calibrate the second bias to achieve a target capacity of the magnetic media.

* * * * *